Jan. 3, 1950     I. S. EGGLESTON     2,493,479
LIVE ROLLER CONVEYER
Filed July 29, 1946     2 Sheets-Sheet 1
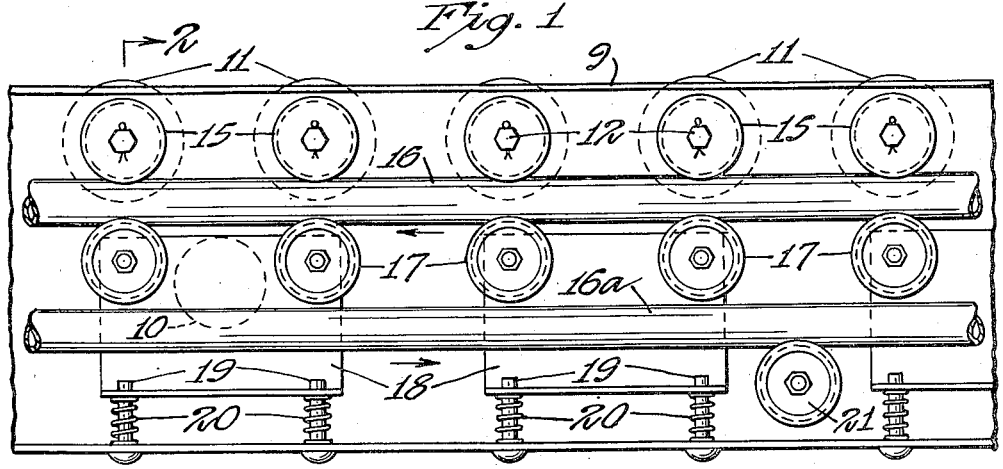
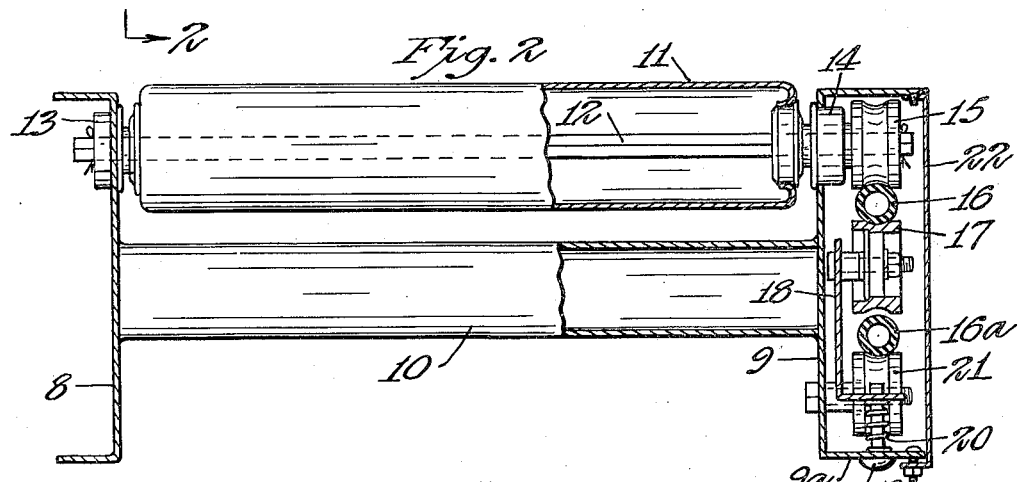
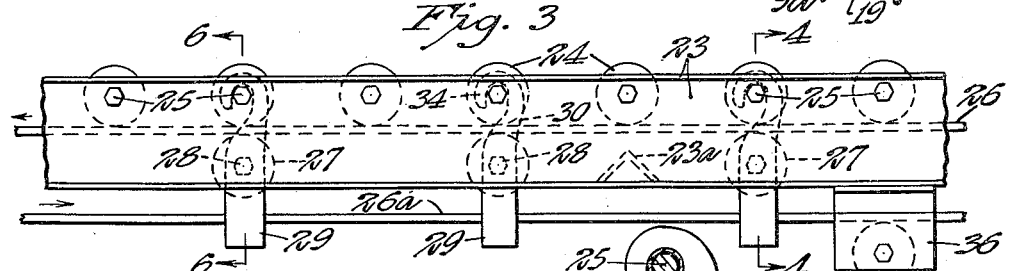
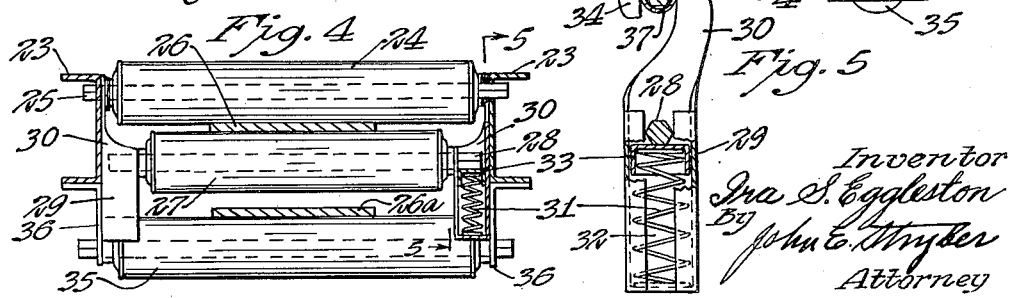
Inventor
Ira S. Eggleston
By John E. Snyder
Attorney

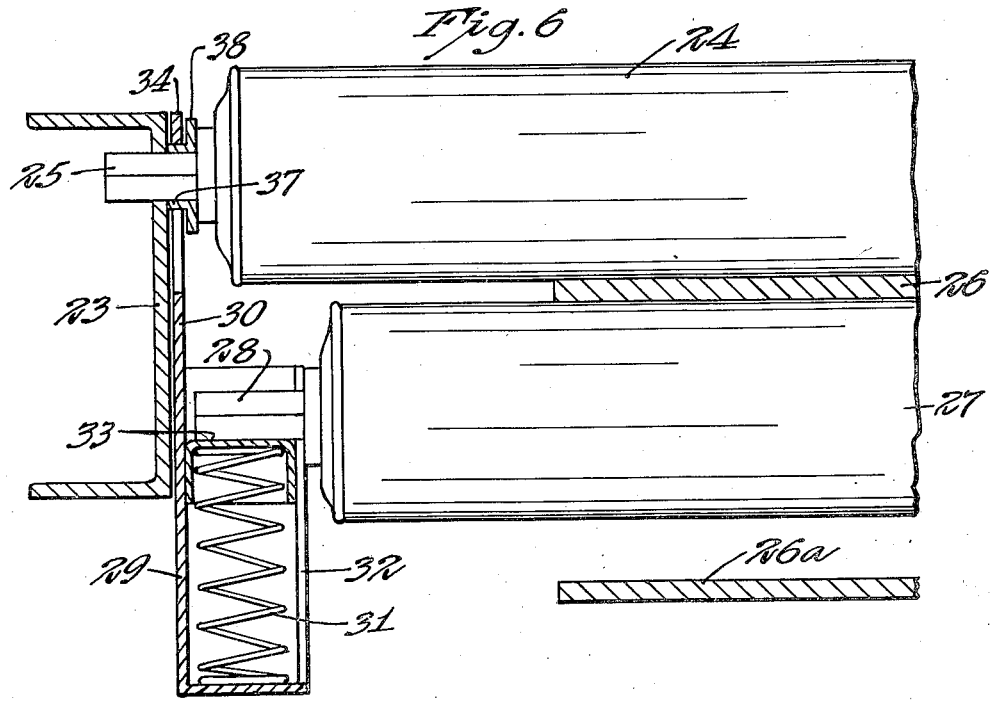
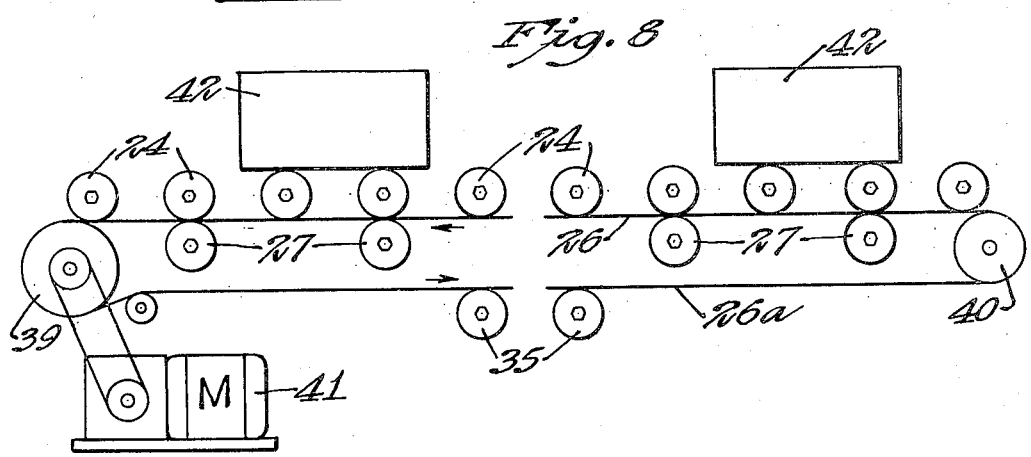
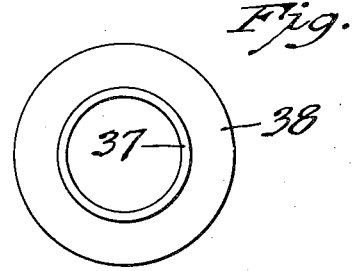

Patented Jan. 3, 1950

2,493,479

UNITED STATES PATENT OFFICE 2,493,479

LIVE ROLLER CONVEYER

Ira Smith Eggleston, St. Paul, Minn., assignor to Standard Conveyor Company, North St. Paul, Minn., a corporation of Minnesota Application July 29, 1946, Serial No. 686,885

3 Claims. (Cl. 198—127)

This invention relates to conveyors of the type having load carrying rollers, sometimes called carrier rollers, which are actuated by a belt, either directly or indirectly, and particularly to means for supporting the belts in driving relation to the carrier rollers or to pulleys operatively connected thereto.

It is an object of this invention to provide in a conveyor of this class a novel arrangement of pressure rollers whereby a predetermined frictional driving force may be applied to the several driven rollers through a belt, irrespective and independently of variations in the tension of the belt.

Another object is to minimize the flexing of the driving belt and thereby reduce the consumption of power and prolong the life of the belt.

A particular object is to compress the belt against each of the driven rollers by means of spring actuated pressure rollers which limit the frictional driving force on the several driven rollers and cause the belt to follow a substantially straight path between them.

Another object is to reduce the danger of injury to personnel engaged in loading and unloading conveyors of this class by providing belt pressure rollers which are resiliently supported and individually movable away from the driven rollers, together with the belt, so that in case a hand or other member of a human body becomes caught between any driven roller and the belt the pressure applied to such member will be insufficient to cause injury or damage.

Other objects will appear and be more fully pointed out in the following specification and claims.

In conventional conveyors of this live roller type, the driving belt is held in frictional engagement with the lower peripheries of spaced load carrying rollers by actuating rollers located in the spaces between the adjacent driven or load carrying rollers and with the actuating rollers so elevated that the belt is snubbed upward between each pair of the driven rollers and engages the periphery of each of them over a substantial arc. This arrangement of belt and actuating rollers results in the loss of some power in flexing the belt and has other inherent disadvantages which include danger of injury to personnel engaged in loading and unloading the conveyor and difficulty in stopping or retarding loads in transit along the conveyor. With the belt snubbed in the usual manner at frequent intervals along the conveyor, the force tending to rotate the individual driven rollers increases progressively with the increase in the belt tension and the latter is increased when any driven roller is retarded or stopped as by the stoppage of the load supported thereon or by the passage of an object between the belt and a driven roller. Consequently injury to personnel has sometimes resulted when the hands of operators have been caught between a driven roller and the driving belt of conventional live roller conveyors. Conveyors of this type are frequently used in situations where it is desirable to retard or stop units of the load at selected stations along the conveyor without interrupting the normal operation of the belt. When this is attempted and loads of certain fragile kinds are stopped on a conveyor having the common snubbed belt arrangement, increased tension in the continuously moving belt and increased friction between it and the carrier rollers forces the latter to turn in engagement with the stationary or retarded load units with resulting damage to the latter in many cases and unnecessary power consumption. By the present invention I obviate these and other objectionable features of conventional live roller conveyors.

The invention will be best understood by reference to the accompanying drawings which illustrate, by way of example and not for the purpose of limitation, preferred embodiments of the invention.

Referring to the drawings:

Figure 1 is a fragmentary side elevational view showing my invention as applied to a conveyor having an actuating belt extending along one side of the frame or rail;

Fig. 2 is a substantially vertical cross sectional view taken approximately on the line 2—2 of Fig. 1;

Fig. 3 is a fragmentary side elevational view illustrating the invention as applied to a conveyor having a belt engaging the lower peripheries of the load carrying rollers;

Fig. 4 is a cross sectional view taken approximately on the line 4—4 of Fig. 3;

Fig. 5 is a part elevational and part sectional view of one of the hangers supporting the pressure rollers, taken approximately on the line 5—5 of Fig. 4;

Fig. 6 is a fragmentary cross section taken on the line 6—6 of Fig. 3;

Fig. 7 is an end view of one of the spacing members, and

Fig. 8 is a diagrammatic side view showing a suitable arrangement of power driving mechanism for the belt.

Referring to Figs. 1 and 2, the conveyor has parallel side rails 8 and 9 connected together at suitable intervals by rigid cross members 10 and spaced, carrier rollers 11 adapted to support loads on their upper peripheries, extending crossways between the rails. Each of the rollers 11 is fixed on an axial shaft 12 and the latter is revolubly mounted in anti-friction bearings 13 and 14 supported on the rails 8 and 9 respectively. The several shafts 12 project outward from the bearings 14 and small pulleys 15 are fixed on the projecting ends. Grooved peripheries are formed on the pulleys 15 for engagement with a driving belt 16 of circular shape in cross section. This belt is trained on guiding and driving pulleys located at opposite ends respectively of the conveyor and has a return reach 16a extending below its upper reach in conventional manner.

Mounted adjacent to and beneath each of the pulleys 15 is a pressure roller 17 which is spring actuated so that the belt 16 is held under compression laterally and in frictional driving relation to the several pulleys 15. The rollers 17 are arranged in pairs and each pair is supported on an angle bracket 18 which is movable substantially radially of the rollers 11 above and guided on studs 19 projecting from a substantially horizontal flange 9a formed on the rail 9. Helical springs 20 are severally mounted on the studs 19 and arranged to bias the brackets 18 carrying the rollers 17 upward. The return reach 16a of the belt 16 is supported at intervals on rollers 21 mounted on the rail 9. Removably secured to the horizontally disposed flanges of the rail 9 is a cover plate 22 (Fig. 2). It will be evident that in the form of the invention shown in Figs. 1 and 2 the driving belt and its supporting and guiding rollers, together with the driven pulleys 15, are enclosed in the housing formed by the rail 9 and plate 22.

In operation, the belt 16 is held in frictional driving engagement with the pulleys 15 by the pressure rollers 17 and extends in a substantially straight course between the several pulleys. The carrier rollers 11 are individually rotated by a force which is proportional to the pressure exerted by the individual springs 20.

In the form of the invention shown in Figs. 3 to 7 inclusive, the conveyor has side rails 23 connected by rigid cross members 23a and there are a multiplicity of spaced carrier rollers 24 which are freely revoluble on supporting shafts 25 carried by the rails. A belt 26 of the flat type is held in frictional driving relation to selected rollers 24 by pressure rollers 27. Each of the driven carrier rollers 24 has associated with it a pressure roller 27 which extends substantially parallel to it and is spring actuated to compress the belt laterally against its lower periphery. As shown, each roller 27 is freely revoluble on a supporting rod 28 and the latter projects from the ends of the roller into spring housings 29 formed integral with hangers 30. Each of the housings 29 contains a helical spring 31 and is formed with a vertically extending opening 32 in its inner, vertical wall through which an end of a rod 28 projects. The spring 31 is confined between the bottom of the housing 29 and a relatively movable cap 33 on which the rod 28 rests. A wide range of vertical movement of the rod 28 is permitted by the elongated openings 32 extending from the top to the bottom of the housing 29. At its upper end each hanger 30 is formed with a hook member 34 which supports it on the axial rod 25 of the associated carrier roller 24.

At suitable intervals rollers 35 are mounted on brackets 36 depending from the rails 23 to support the return reach 26a of the belt 26. As best shown in Fig. 6, the hook members 34 of the hangers 30 extend in the spaces between the ends of the rollers 24 and the rails 23 and are preferably arranged to severally embrace spacing members 37 mounted on the rods 25 and formed with annular flanges 38 engaging the ends of the rollers. In assembling the conveyor, the spacing members 37 are installed on all of the carrier rollers so that the pressure rollers 27 may be thereafter installed wherever needed to apply the belt drive to selected carrier rollers 24. As indicated in Fig. 8, the belt 26 may be trained on a power driven drum 39 at one end of the conveyor and on an idler roller 40 at the other end and power from a motor 41 may be transmitted in suitable manner to the drum 39. Load units indicated by the numeral 42 are carried on the upper peripheries of the rollers 24.

Each pair of hangers 30 is free to oscillate about the axis of the carrier roller above and each of the pressure rollers 27 is movable radially of its associated carrier roller. It will be evident that the compressive force applied to the belt at the periphery of each driven roller is exerted entirely by the springs 31 and is directed perpendicularly to the plane in which the belt moves. Where the lower peripheries of the driven rollers extend in a common plane, as in the majority of the installations, the upper surface of the belt 26 will move substantially in the same plane or along a substantially straight course between driven rollers. Consequently there is substantially no flexing of the belt between driven carrier rollers and efficient use of power results.

By this arrangement I apply controlled torque to each driven roller which is independent of the belt tension. It has been determined that the required torque for moving ordinary load units up the maximum feasible degree of incline, e. g., approximately 6°, can be obtained with belt pressures low enough to avoid injury to a human hand when it is passed between the belt and a carrier roller 24. Downward movement of the individual pressure rollers from the normal operating position equal to approximately one and one-half inches is sufficient to prevent injury where suitably light spring pressures are employed. For example, each spring may be designed to exert approximately 8 pounds pressure when extended and 18 pounds when compressed fully or about 1½ inch. Obviously such values are not critical and the design of the springs for any particular installation may be varied depending upon the weight and character of the load units to be carried and the maximum required incline of the load carrying surface.

My invention has distinct advantages for use where the load units are to be retarded or stopped in transit on the conveyor. Assuming proper design of the springs for actuating the pressure rollers, when the forward movement of a load unit supported on one or more live carrier rollers 11 or 24 is arrested, the belt merely slips in contact with the load supporting rollers or the associated pulleys 15, thus allowing the carrier rollers to remain stationary under the load unit. This avoids damage to the bottom surfaces of the load units and minimizes the consumption of power in the operation of the belt.

Having described my invention, what I claim as new and desire to protect by Letters Patent is:

1. A conveyor comprising, side rails, an axial support for a roller mounted on said rails, a load carrying roller mounted on said support, hangers depending from said support near the ends of the roller respectively, a pressure roller disposed beneath the load supporting roller, resilient means supporting the pressure roller on said hangers and permitting movement of the pressure roller to and from the load carrying roller and a driving belt held under compression in the bight of said rollers.

2. A conveyor comprising, side rails, an axial support for a roller supported on said rails, a load carrying roller mounted on said support, hangers depending from said support near the ends of said roller respectively, a pressure roller disposed beneath said load supporting roller to form a bight to receive a driving belt, resilient means supporting said pressure roller on said hangers and permitting movement of the pressure roller to and from the load carrying roller and a belt for driving the load carrying roller held under compression in the bight of said rollers, said hangers being individually free to oscillate about the axis of the load supporting roller.

3. A conveyor comprising, side rails, an axial support for a roller extending between and supported on said rails, a load carrying roller mounted on said support, the ends of said roller being spaced from the rails, hangers depending from said support in the spaces between the ends of said roller and the rails respectively, a pressure roller disposed beneath said load supporting roller in parallel relation thereto, resilient means supporting the pressure roller on said hangers and permitting movement of the pressure roller to and from the load carrying roller and a belt for driving the load carrying roller held under compression in the bight between the same and said pressure roller, said hangers being free to oscillate about the axis of the load carrying roller.

IRA SMITH EGGLESTON.

REFERENCES CITED

The following references are of record in the file of this patent:

UNITED STATES PATENTS

| Number | Name | Date |
|---|---|---|
| 1,614,816 | York | Jan. 18, 1927 |
| 1,883,426 | Walter et al. | Oct. 18, 1932 |
| 1,903,732 | Walter et al. | Apr. 11, 1933 |
| 2,016,700 | Anderson | Oct. 8, 1935 |
| 2,129,510 | Taylor | Sept. 6, 1938 |

FOREIGN PATENTS

| Number | Country | Date |
|---|---|---|
| 567,808 | Germany | Jan. 10, 1933 |